(12) United States Patent
Truong et al.

(10) Patent No.: US 11,340,784 B1
(45) Date of Patent: May 24, 2022

(54) VERIFICATION MICROSERVICE FOR A DEDUPLICATED OBJECT STORAGE SYSTEM WITH WORKER NODE ESTIMATION

(71) Applicant: EMC IP Holding Company LLC, Hopkinton, MA (US)

(72) Inventors: Tipper Truong, San Jose, CA (US); Joseph Brandt, Salt Lake City, UT (US); Philip Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 16/913,086

(22) Filed: Jun. 26, 2020

(51) Int. Cl.
*G06F 3/06* (2006.01)

(52) U.S. Cl.
CPC .......... *G06F 3/0604* (2013.01); *G06F 3/0638* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | |
|---|---|---|---|
| 10,397,185 B1 * | 8/2019 | Sandholm | H04L 63/101 |
| 10,887,279 B2 * | 1/2021 | Sandholm | H04L 63/102 |
| 10,936,233 B2 * | 3/2021 | Kucherov | G06F 3/0647 |
| 11,068,606 B2 * | 7/2021 | Baboval | H04L 9/0894 |
| 11,106,375 B2 * | 8/2021 | Narayanamurthy | H04L 9/0822 |
| 11,140,093 B2 * | 10/2021 | Parker | H04L 67/1014 |
| 2010/0128722 A1 * | 5/2010 | Madour | H04L 12/66 370/352 |

(Continued)

OTHER PUBLICATIONS

Iraklis Leontiadis and Reza Curtmola. 2018. Secure Storage with Replication and Transparent Deduplication. In Proceedings of the Eighth ACM Conference on Data and Application Security and Privacy (CODASPY '18). Association for Computing Machinery, New York, NY, USA, 13-23 (Year: 2018).*

(Continued)

*Primary Examiner* — Daniel C. Chappell
(74) *Attorney, Agent, or Firm* — Dergosits & Noah LLP; Todd A. Noah

(57) ABSTRACT

Described is a system for detecting corruption in a deduplicated object storage system accessible by one or more microservices while minimizing costly read operations on objects. A controller module and one or more worker nodes execute verification paths in concert with each other to identify object corruptions. The controller module estimates a number of worker nodes required for execution of different types of verification paths.

20 Claims, 12 Drawing Sheets

(56) References Cited

U.S. PATENT DOCUMENTS

| | | | | |
|---|---|---|---|---|
| 2010/0268580 | A1* | 10/2010 | Vermes | G06F 21/10 |
| | | | | 705/14.1 |
| 2011/0302617 | A1* | 12/2011 | Greenfield | H04N 7/17336 |
| | | | | 725/96 |
| 2017/0046134 | A1* | 2/2017 | Straub | G06F 8/31 |
| 2019/0087588 | A1* | 3/2019 | Baboval | G06F 21/602 |
| 2020/0005048 | A1* | 1/2020 | Bharde | H04N 21/23418 |
| 2020/0127939 | A1* | 4/2020 | Parker | H04L 47/828 |
| 2020/0145374 | A1* | 5/2020 | Sandholm | H04L 63/0209 |
| 2020/0320046 | A1* | 10/2020 | Narayanamurthy | H04L 9/3239 |
| 2022/0075557 | A1* | 3/2022 | Slik | G06F 3/0604 |

OTHER PUBLICATIONS

João Paulo and José Pereira. 2014. A Survey and Classification of Storage Deduplication Systems. <i>ACM Comput. Surv.</i> 47, 1, Article 11 (Jul. 2014), 30 pages (Year: 2014).*

Frederik Armknecht, Jens-Matthias Bohli, Ghassan O. Karame, and Franck Youssef. 2015. Transparent Data Deduplication in the Cloud. In Proceedings of the 22nd ACM SIGSAC Conference on Computer and Communications Security (CCS '15). Association for Computing Machinery, New York, NY, USA, 886-900 (Year: 2015).*

X. Zhang, Z. Huo, J. Ma and D. Meng, "Exploiting Data Deduplication to Accelerate Live Virtual Machine Migration," 2010 IEEE International Conference on Cluster Computing, 2010, pp. 88-96 (Year: 2010).*

* cited by examiner

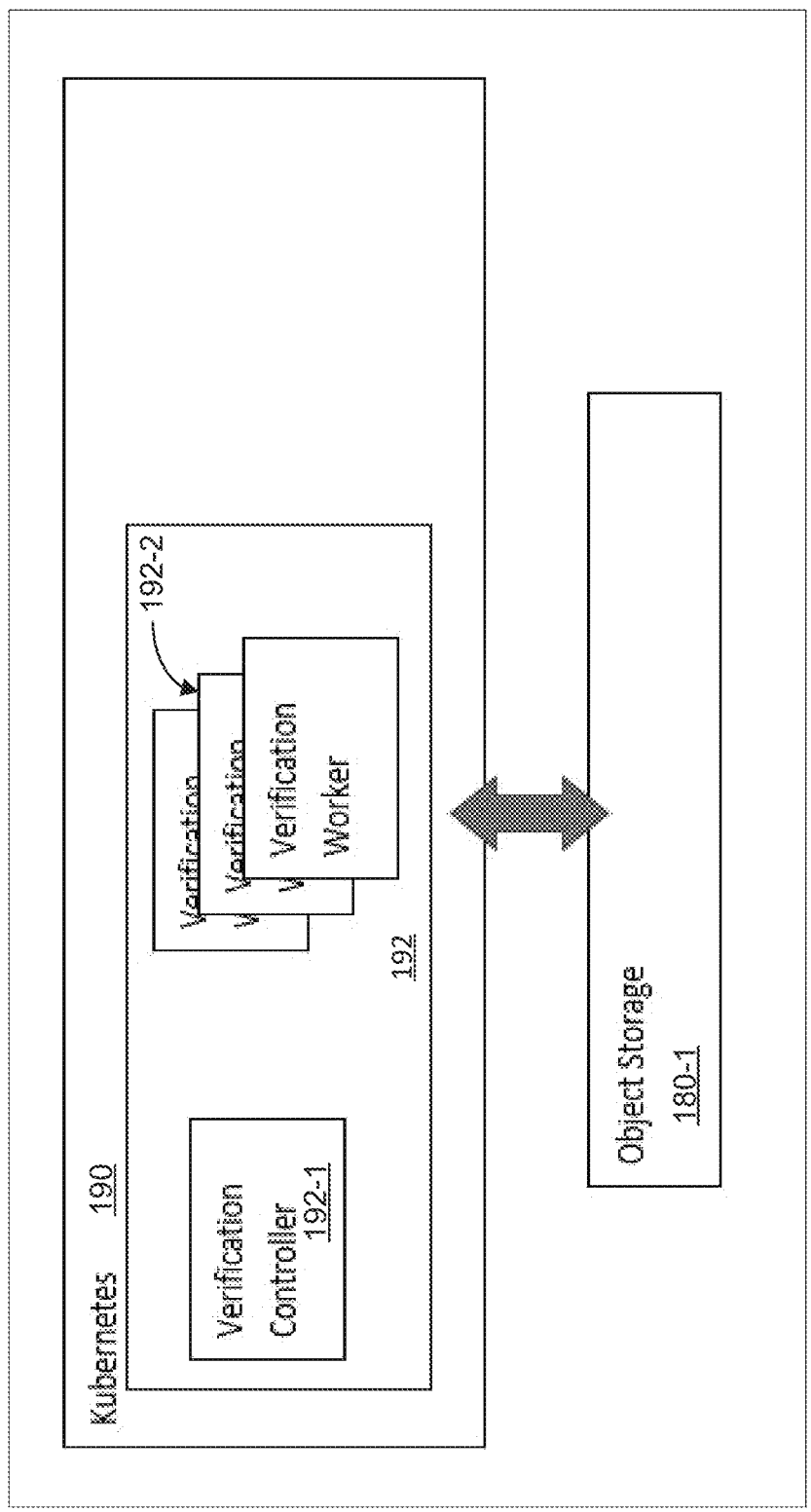

VERIFICATION MICROSERVICE FOR A DEDUPLICATED OBJECT STORAGE SYSTEM WITH WORKER NODE ESTIMATION

TECHNICAL FIELD

This disclosure relates to deduplication systems, and more particularly, to relationship between data stored within deduplication systems.

BACKGROUND

In computing, a data storage system is a key component to store data for computation and transferring. Data files generally contain redundant data. For example, an email file may contain email threads that earlier emails are copied multiple times in the later replies. In an enterprise setting, many versions of the same information are stored for record keeping. Storing data files like these without modification wastes storage space and data deduplication is a way to reduce data redundancy in a storage system.

In a deduplication system, unique pieces of data, or byte patterns, in a file are identified as "chunks," and they are stored during a process of analysis of the file. The analysis goes through the file, and other chunks are compared to the stored copy and whenever a match occurs, the redundant chunk is replaced with a small reference that points to the stored chunk. Because the same byte patterns may occur many times in a file, the amount of data that must be stored is greatly reduced.

Several factors affect deduplication efficiency. The amount of reduction of storage depends heavily on the distribution of the duplication within a file. The size of chunks also affects the reduction. A smaller chunk size saves more storage as it enables the system to identify more duplicates. However, a smaller chunk size increases the size of meta-data, deduplication time, and fragmentation. Thus, the chunk size selection is a trade-off decision to a deduplication system. Another factor affecting the deduplication efficiency is how a file is divided up for deduplication. Ideally a file should be divided up in a way to maximize the possibility of finding duplicates. In a deduplication system, a file is divided up into data blocks, which are the units of deduplication.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 1C is a block diagram illustrating an example operating environment according to one or more embodiments of the disclosure.

DETAILED DESCRIPTION

Figure 1A:
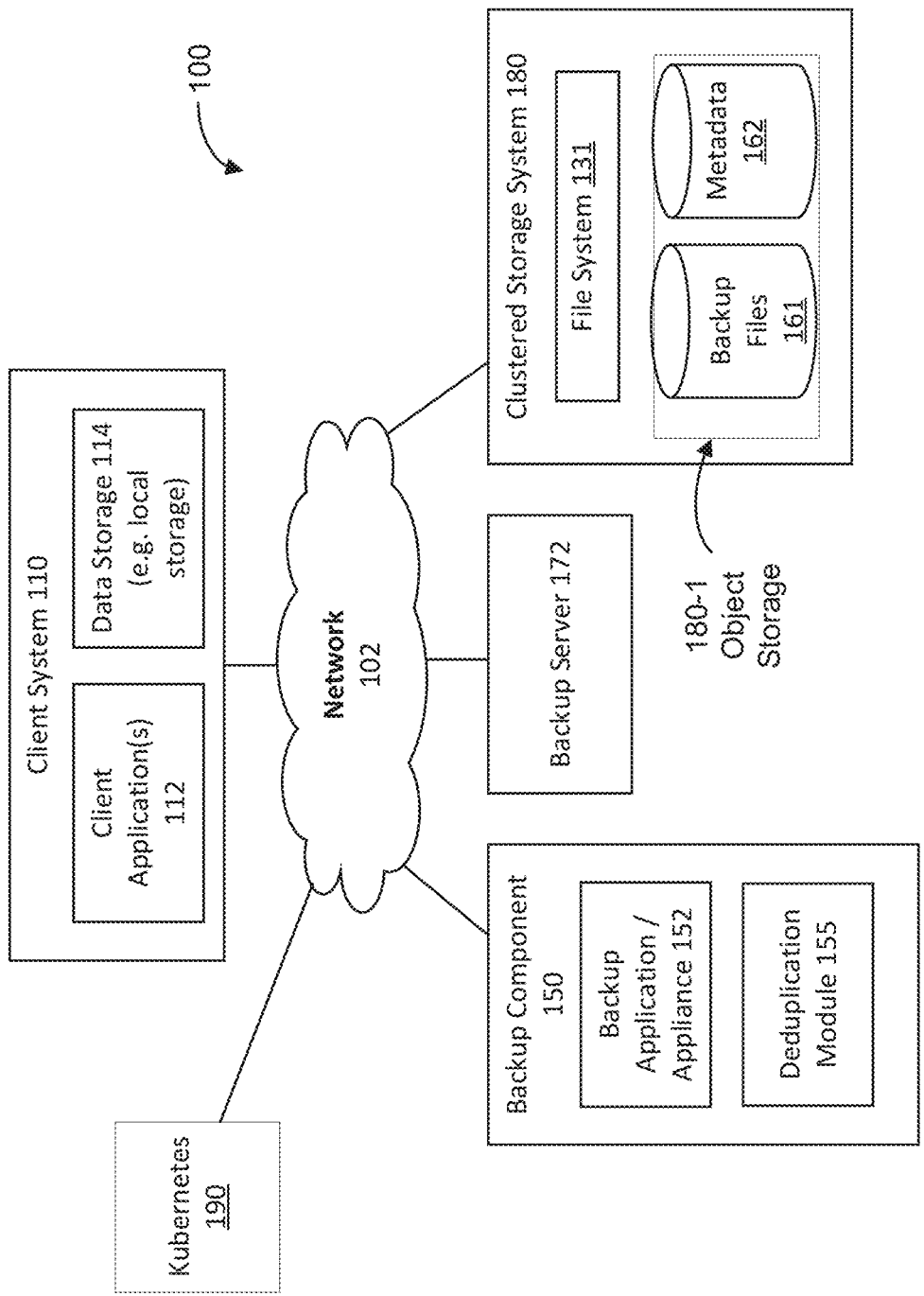
FIG. 1A is a block diagram illustrating an example operating environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method and computer program product) for a verification microservice engine for generating and deploying a controller module and one or more worker nodes to detect corruption in a deduplicated object storage system accessible by one or more microservices while minimizing costly read operations on objects. The verify controller module estimates an optimal number of worker nodes to be instantiated. A verify controller and worker nodes are deployed to a cloud computing environment to execute, in concert with each other, a similarity group verification path or a slice recipe verification path.

According to various embodiments, the verification microservice engine generates a controller module. In order to estimate a number of worker nodes required to support execution of the slice recipe verification path or the similarity group verification path, the controller module determines whether a worker node memory condition occurs, whereby the worker node memory condition indicates an amount of worker node memory for storing the referenced similarity groups exceeds an amount of worker node memory for storing the slice recipe names. The controller module determines a total memory size of slice recipe names in object storage of a deduplicated storage system. Each slice recipe name references a similarity group and each similarity group is pre-assigned to a worker node. The controller module identifies, for each respective worker node to be instantiated by the controller module, worker node memory partitions required to store each slice recipe name. The controller module identifies a worker node memory condition while identifying one or more of the same worker node memory partitions for storing the referenced similarity groups. Based on whether the worker node memory condition occurs, the controller module instantiates one or more worker nodes according to the worker node memory partitions required to store each slice recipe name or the worker node memory partitions required to store the referenced similarity groups.

The similarity group verification path is selected by the verification microservice engine (or the controller module) when a total memory size of all the slice recipe names in a data domain(s) (i.e. one or more deduplication storage systems) is larger than the total memory size taken up by all the similarity groups in the same data domain(s). The slice recipe verification path is selected by the verification microservice engine (or the controller module) when a total memory size of all the slice recipe names in a data domain(s) is lower than the memory size taken up by one or more of the similarity groups in the same data domain(s). The controller module instantiates one or more worker nodes according to which verification path is selected. If the worker node memory condition is detected to trigger the slice recipe verification path, then the controller module instantiates worker nodes according to the internal worker node memory partitions over a plurality of workers nodes that are required for storing slice name recipes. However, if the worker node memory condition is not detected, the similarity group verification path is triggered and the controller module instantiates worker nodes according to the internal worker node memory partitions over the workers nodes that are required for storing similarity groups referenced in the slice recipe names. According to various embodiments, internal worker node memory partitions may be one or more memory partitions allocated for use by a respective worker node.

According to various embodiments, the verification microservice engine also generates and deploys a testing tool. The testing tool uploads one or more objects into object storage of the deduplicated storage system. The objects comprise one or more of: an object recipe name, an object recipe, a slice recipe name, a slice recipe, a similarity group name and a similarity group. The testing tool corrupts internal object metadata of a first subset of the uploaded objects, where internal object metadata references data internal to an uploaded object. The testing tool corrupts external object metadata of a second subset of the uploaded objects, where the external object metadata provides a reference to another uploaded object, such as a relationship between various uploaded objects. The testing tool deletes a third subset of the uploaded objects. The verification microservice performs a slice recipe verification path or a similarity group verification path over the object storage. The testing tool receives a corrupted objects list describing one or more corruptions identified by a controller module and one or more worker nodes during performance of a respective verification path. The testing tool confirms whether the corruptions in the corrupted objects list correspond with the first and second subsets of corrupted uploaded objects and the third subset of deleted uploaded objects in order to confirm that all expected corruptions were captured by the testing tool's performance of either the slice recipe verification path or the similarity group verification path.

In addition, the system provides many benefits in contrast with the limitations of conventional system. The system allows for verifying that all objects in object storage are valid and for confirming whether relationships between objects are still valid. Such relationships include: "object-to-slice recipe," "slice recipe-to-similarity group" and "similarity group-to-compression region."

In some embodiments, such a system may be provided within an operating environment. An example of such an operating environment is further described herein with reference to FIG. 1A. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Exemplary Environments

More specifically, and with reference to FIG. 1A, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data. The clustered storage system 180 may be an object storage system that includes object storage 180-1 (as further described herein).

Figure 1B:
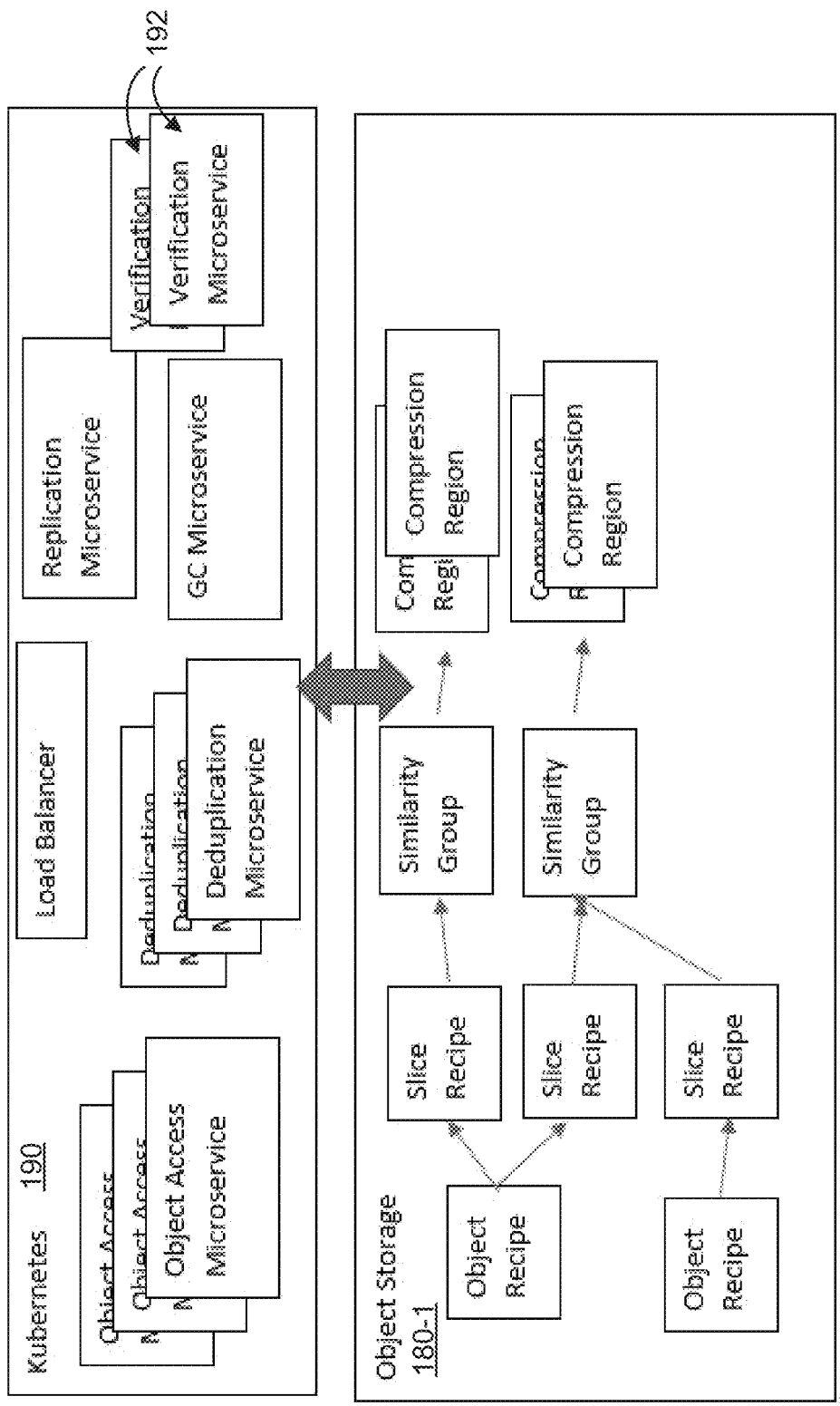
FIG. 1B is a block diagram illustrating an example operating environment according to one or more embodiments of the disclosure.

As shown in FIG. 1B, a cloud-based system platform 190 (such as, for example, a Kubernetes cloud computing environment) may provide for the deployment of various types of microservices. The platform 190 may allow for the deployment of a plurality of verification services 192 for determining whether relationships between objects in object storage 180-1 are still valid. As shown in FIG. 1C, various types of verification microservices 192 may be a verification controller 192-1 ("controller module") and a verification worker(s) 192-2 ("worker node(s)").

Figure 1D:
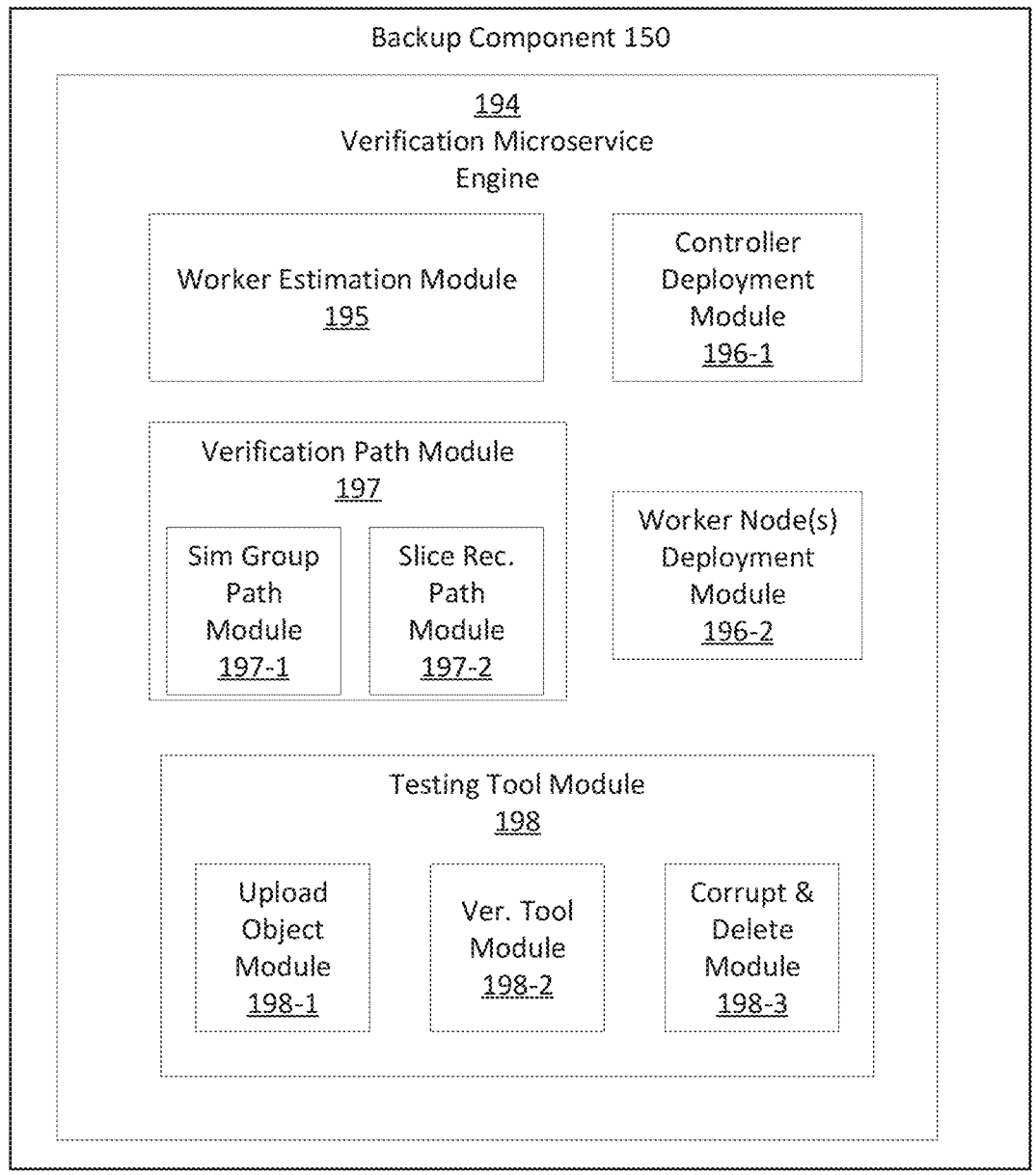
FIG. 1D is a block diagram illustrating an example operating environment according to one or more embodiments of the disclosure.

As shown in FIG. 1D, the verification microservice engine 194 may be included within the backup component 150. The verification microservice engine 194 includes a worker estimation module 195 that estimates an optimal amount of worker nodes to be instantiated. A verification path module 197 includes a similarity group path module 197-1 to execute the similarity group verification path based on detection of a similarity group verification path condition. The verification path module 197 also includes a slice recipe path module 197-2 to execute the slice recipe verification path. The slice recipe verification path is executed based on detection of a slice recipe verification path condition. A controller deployment module 196-1 instantiates a controller module 192-1 to perform controller module functionalities. The controller deployment module 196-1 also deploys the controller module 192-1 to the platform 190. A worker deployment module 196-2 instantiates one or more worker nodes 192-2 to perform worker node functionalities. The worker deployment module 196-2 also deploys the one or more worker nodes 192-2 to the platform 190. The verification microservice engine 194 includes a testing tool module 198 with an upload object module 198-1, a verification tool module 198-2 and a corrupt and delete module 198-3.

Object Recipes, Slice Recipes, Similarity Groups & Compression Regions

Figure 2:
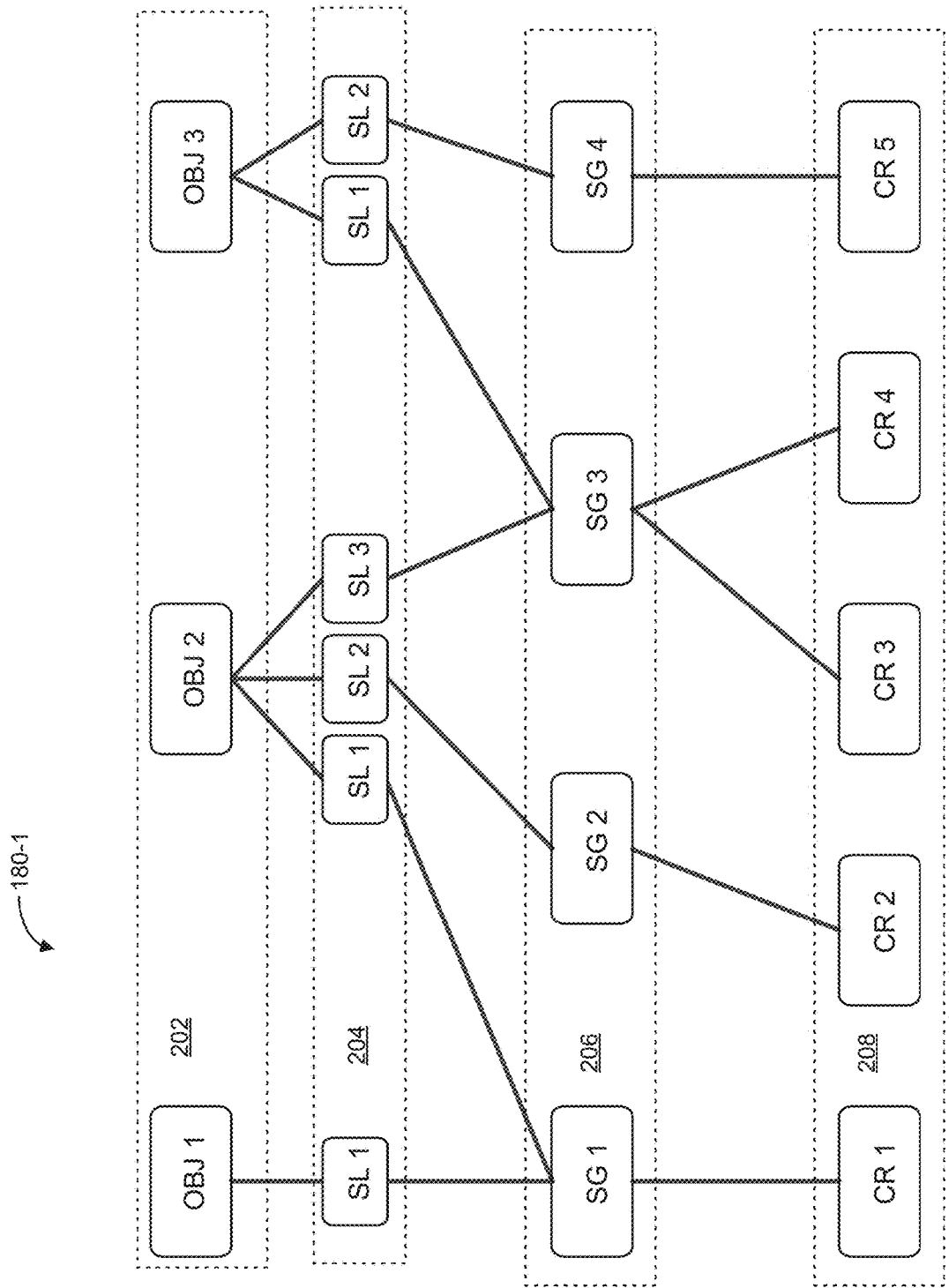
FIG. 2 is a block diagram illustrating relationships between object recipes, slice recipes, similarity groups and compression regions according to one or more embodiments of the disclosure.

As shown in FIG. 2, a portion of object storage 180-1 may include a plurality of object recipes 202 (obj1, obj2, obj3), a plurality of slice recipes 204 (sl1 sl2, sl3), a plurality of similarity groups 206 (sg1, sg2, sg3, sg4) and a plurality of compressions regions 208 (cr1, cr2, cr3, cr4, cr5). In various embodiments, when a customer's object is written to a microservice via a client, the object is split or divided into one or more parts—or sets of segments. A fingerprint is computed for each segment from the object. In other words, an object part may have multiple segments and a fingerprint is computed for each segment of the object part. Thus, each fingerprint maps to a segment of an object part. Lists of fingerprints are organized into slice recipes. Specifically, a slice recipe may include an array of fingerprints and sizes of segments that correspond to each respective fingerprint in the array. A sketch may then be computed for each slice recipe according to one or more sketch algorithms.

Slice recipes may then be organized into similarity groups. Specifically, a similarity group may include one or more slice recipes that have the same computed sketch. Stated differently, slice recipes are similar to each other if they have the same sketch. An object recipe, then, forms a one-to-one mapping to customer objects and references the one or more slice recipes associated with the object, since the associated slice recipes are based on an array of fingerprints of the object's segment(s). The actual segments that are unique according to the deduplication service may be stored in in a compressed format in the compression regions.

Each object has a corresponding object recipe. The object recipe may be identified based on the name given to an object by the customer or user or by an object recipe naming convention that references the corresponding object and the object's data domain. In a specific embodiment, a name of the object recipe is generated by obtaining a name of an object (as provided by the user) and concatenating, augmenting, or tagging the object name with additional metadata or tags to form the name of the object recipe.

Data Structures, Metadata & Naming Conventions

Figure 3:
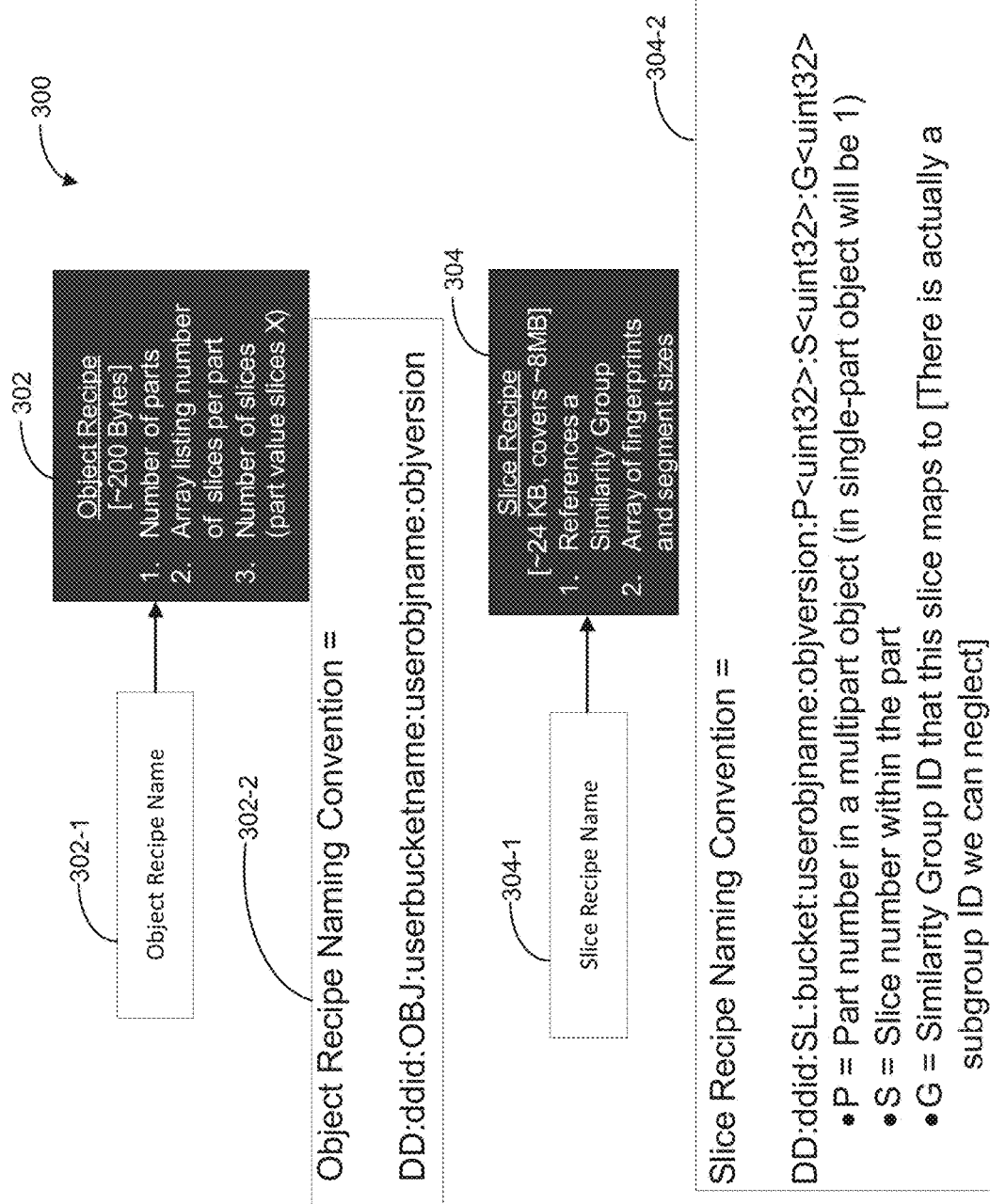
FIG. 3 is a block diagram illustrating naming conventions according to one or more embodiments of the disclosure.

As shown in FIG. 3, a diagram 300 illustrates an object recipe data structure 302 and a slice recipe data structure 304. The object recipe data structure 302 has metadata that indicates the number of parts of an object's data and an array stores metadata indicating how many slices of object data make up each individual object data part. Each slice may include one or more segments of object data, such as 8 KB of data. The slice recipe data structure 304 metadata further includes an internal reference variable indicating, for each object part indexed in the array, how many total slices correspond to that object part index.

Each object recipe has an object recipe name 302-1 that is a string in an object naming convention 302-2 (or object name format). The object naming convention 302-2 includes the object's data domain ("DD"), the data domain identifier ("ddid"), the object identifier ("OBJ"), customer data ("userbucketname," "userobjname") and an object version number ("objversion"). According to various embodiments, a data domain may represent a product line or be a pre-assigned unique prefix.

The slice recipe data structure 304 includes metadata that includes a reference to a similarity group and a fingerprint array. The reference to the similarity group indicates a "slice recipe-to-similarity group" relationship. As described above, fingerprints are computed for each data segment from an object. The fingerprint array, then, includes an array of the fingerprints for those fingerprints included in a slice and the fingerprint further includes the sizes of each segment represented by a fingerprint. The slice recipe also identifies the object data part to which the particular slice belongs.

Each slice recipe has a slice recipe name 304-1 that is a string in a slice recipe naming convention 304-2 (or slice recipe name format). The slice recipe naming convention 302-2 includes the slice recipe's data domain ("DD"), the data domain identifier ("ddid"), a slice recipe identifier ("SL"), customer data ("userobjname"), the version number ("objversion") as was well indicating the object part ("P<...>"), an indication of which slice (from the slices for the object part) the slice recipe pertains ("S<...>") and a similarity group identifier ("G<...>") for the similarity group referenced in the slice recipe data structure 304.

Figure 4:
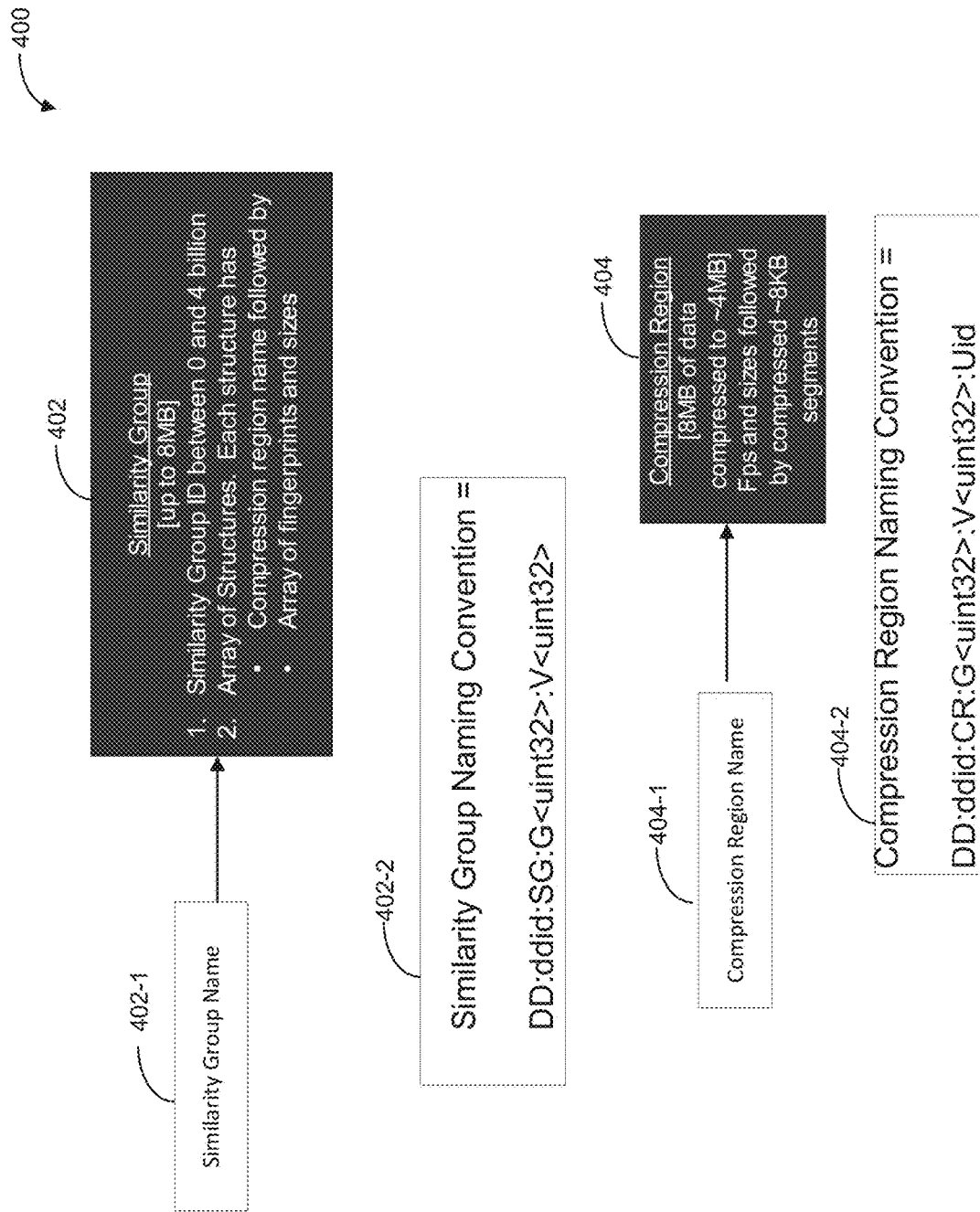
FIG. 4 is a block diagram illustrating naming conventions according to one or more embodiments of the disclosure.

As shown in FIG. 4, a diagram 400 illustrates a similarity group data structure 402 and a compression region data structure 404. The similarity group data structure 402 has metadata that includes a unique similarity group identifier. While a similarity group may reference multiple compression regions, each compression region itself is only referenced by a single similarity group. The similarity group data structure 402 metadata also includes an array of structures. Each structure includes a name of an underlying compression region name followed by a fingerprint array and corresponding segment sizes. Actual data segments (i.e. those data segments included in respective slices and represented by a specific fingerprint) that have been determined to be unique may be stored in a compressed format in a compression region, which is uniquely identified by its own compression region name—which is included in the similarity group data structure 402 metadata also includes an array of structures. Each compression region name in the metadata thereby indicates a "similarity group-to-compression region" relationship.

Each similarity group has a similarity group name 402-1 that is a string in a similarity group naming convention 402-2 (or similarity group name format). The similarity group naming convention 402-2 includes the similarity group's data domain ("DD"), which is a predetermined prefix string, the data domain identifier ("ddid"), a similarity group identifier ("SG") which indicates the object being identified is a similarity group and that similarity group's actual identifier ("G").

The compression region data structure 404 includes compressed unique data segments and the compressed data segment's correspond fingerprint and segment size. Each compression region has a compression region name 404-1 that is a string in a compression region naming convention 404-2 (or compression region name format). The compression region naming convention 404-2 includes the compression region's data domain ("DD"), the data domain identifier ("ddid"), a compression region identifier ("CR"), and the user identifier ("Uid"). According to various embodiments, the "Uid" may be a hash value calculated over a fingerprint and segment size array which is used for a compression region name.

Figure 5:
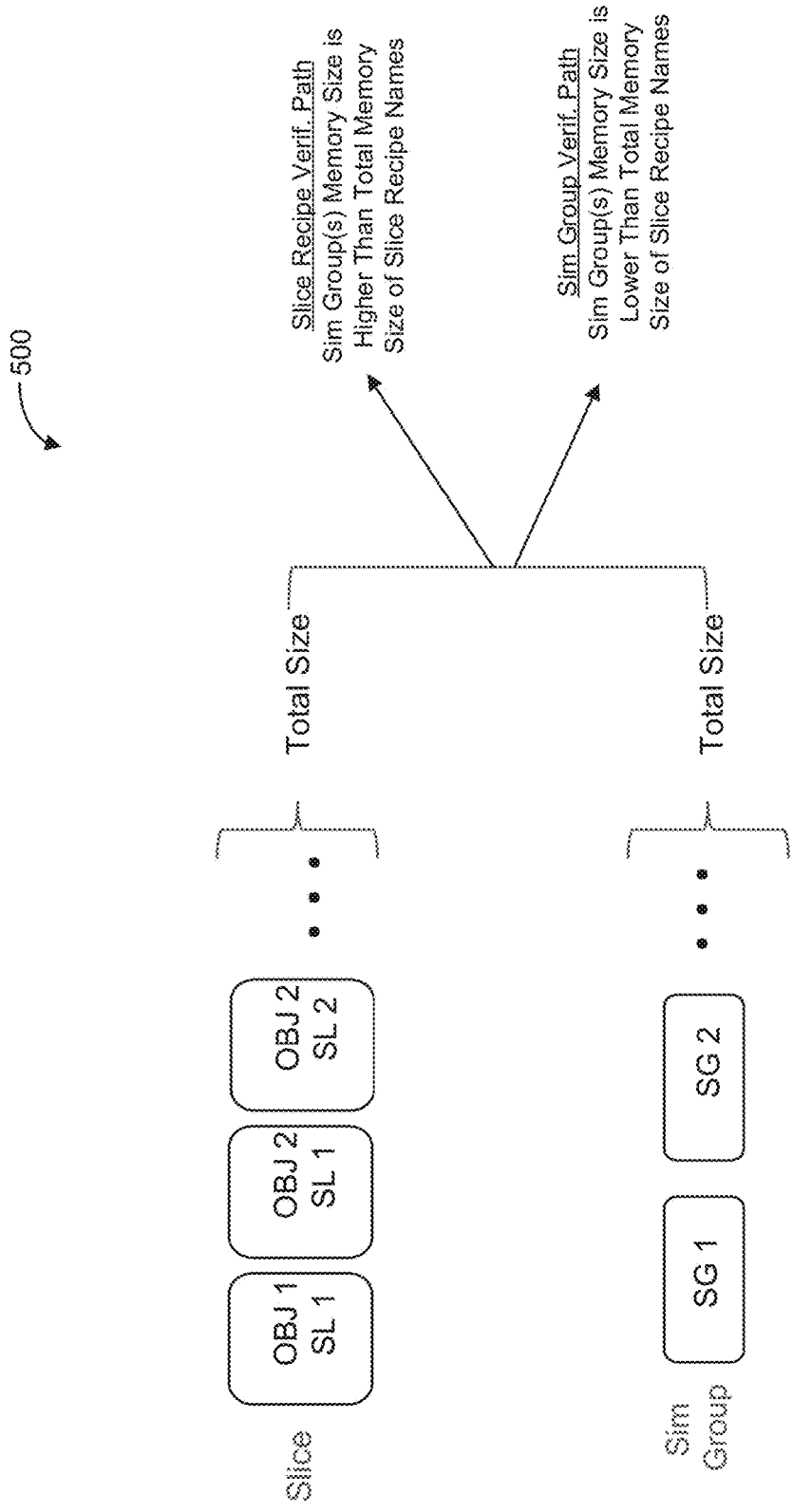
FIG. 5 is a block diagram illustrating a verification path conditions according to one or more embodiments of the disclosure.

As shown in FIG. 5, a condition (such as the worker node memory condition) must occur in order for the controller module 192-1 to select the slice recipe verification path or the similarity group verification. The worker node condition is detected when the amount of worker node memory required to store similarity groups exceeds the amount of worker node memory required to store all slice recipe names. When the worker node condition occurs, the controller module 192-1 selects the slice recipe verification path. Absence of the worker node condition represents that storing similarity groups in worker node memory requires less available worker node memory than storing all the slice recipe names. Based upon absence of the worker node condition, the controller module 192-1 selects the similarity group verification path. That is, the similarity group verification path is selected based on determining that the amount of worker node memory required to store similarity groups is less than the amount of worker node memory required to store all slice recipe names. In some embodiments, the controller module 192-1 may select the slice recipe verification while the controller module 192-1 is tallying the worker node memory partitions for storing similarity groups referenced in the slice recipe names in object storage 180-1. The controller module 192-1 may detect that the total amount of memory from worker node memory partitions currently identified for a subset of the referenced similarity groups already exceeds the total amount of memory from worker node memory partitions for storing slice recipe names—even though controller module 192-1 has not completed tallying worker node memory partitions required for storing all referenced similarity groups.

Figure 6A:
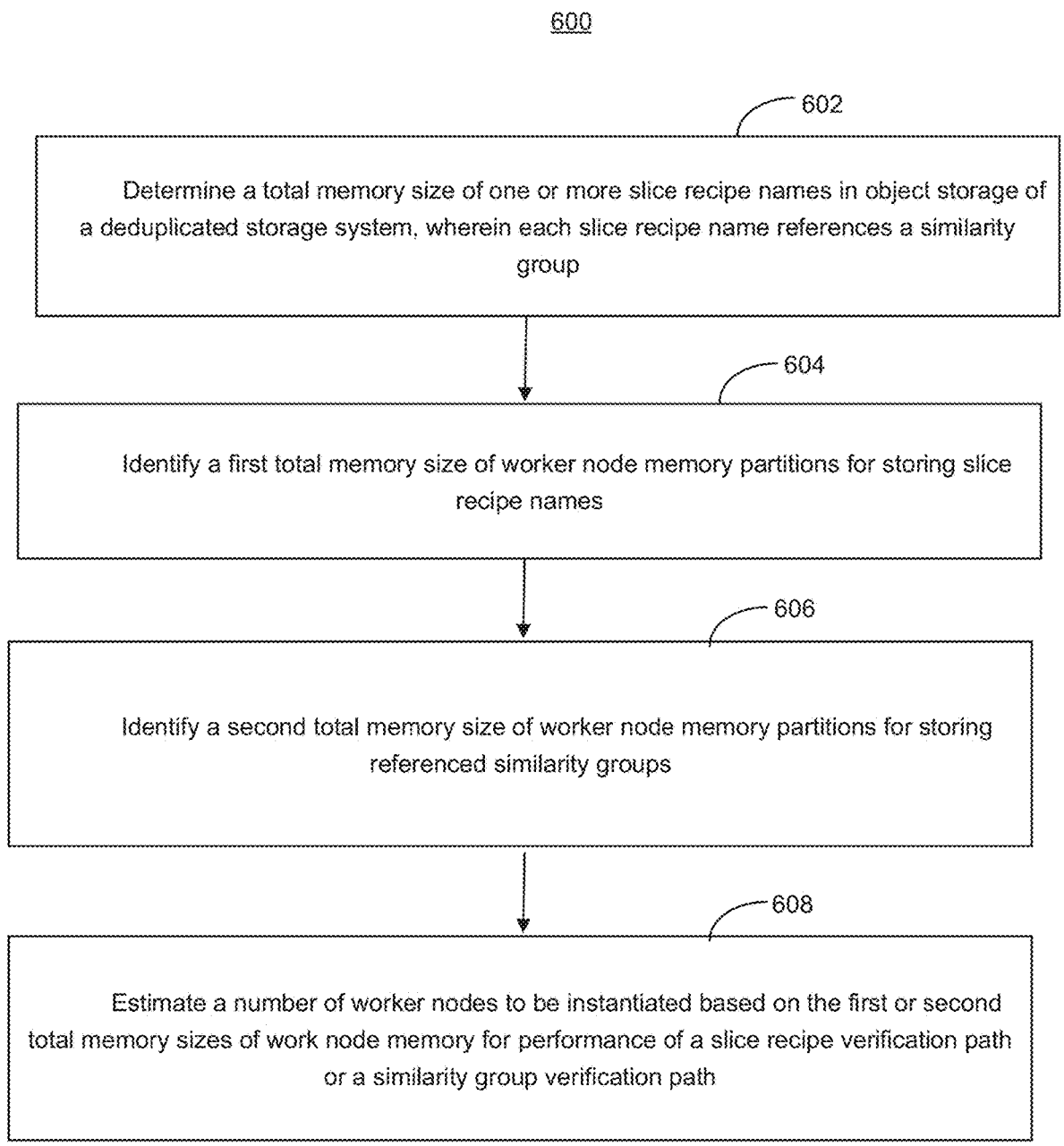
FIG. 6A is a flow diagram illustrating an example method according to one or more embodiments of the disclosure.

As shown in FIG. 6A, method 600 includes at step 602, the verification microservice engine 194 generates a controller module to determine a total memory size of slice recipe names in object storage of a deduplicated storage system, wherein each slice recipe name references a similarity group. For example, the controller module 192-1 may access a memory size of each slice recipe name string stored in object storage 180-1. The controller module 192-1 may aggregate the memory sizes of each slice recipe name string in order to calculate the total memory size of the slice recipe names.

At step 604, the verification microservice engine 194 generates the controller module to identify, for each respective worker node to be instantiated by the controller module 192-1, one or more partitions of worker node memory required to store each slice recipe name that references any similarity group preassigned to the respective worker node. However, since the slice recipe name strings each include a similarity group identifier and worker node-to-similarity group pairings are pre-the amount of available worker node memory that needs to be reserved to support a plurality of instantiated worker nodes can be determined based on the slice recipe name strings.

For example, three slice recipe name strings may each reference a different similarity group. However, the referenced similarity groups may each have a pre-assigned pairing to a same first worker node. The controller module 192-1 may tally one or more partitions of available worker node memory in the first worker node for storage of the three slice recipe name strings. However, according to another example, if two slice recipe name strings each reference the same similarity group with a preassigned pairing to a second worker node, then the controller module 192-1 may tally one or more partitions of available worker node memory in thesecond worker node for storage of the two slice recipe name strings. The controller module 192-1 continues similarly tallying available worker node memory partitions for all slice recipe name strings such that each worker node is instantiated with a sufficient amount of worker node memory for storing those slice recipe names that reference similarity groups preassigned to that worker node. The controller module 192-1 calculates a total memory size based on all worker node partitions that are to be used for storage of the slice recipe names.

At step 606, the verification microservice engine 194 generates the controller module to identify the worker node memory condition while tallying, for each respective worker node to be instantiated by the controller module 192-1, one or more of the same worker node memory partitions previously identified for storing the slice recipe names that may also be used to store the referenced similarity groups that have been pre-assigned to the respective worker node. For example, after calculating the total memory size of all the worker node memory partitions identified for the slice recipe names, the controller module 192-1 then makes a subsequent pass over all of the worker nodes' available memory. In addition, the controller module 192-1 stores the total memory size of the worker node memory partitions for slice recipe names For example, for the three slice recipe name strings that reference a different similarity group pre-assigned to the same first worker node, the controller module 192-1 may tally one or more worker node memory partitions in the first worker node for storage of the three similarity groups—instead of the three slice recipe name strings. However, according to another example, for the two slice recipe name strings that reference the same similarity group with a preassigned pairing to the second worker node, the controller module 192-1 may tally one or more worker node memory partitions in the second worker node for storage of only the single similarity group—as opposed to both slice recipe name strings. The controller module 192-1 continues similarly tallying available worker node memory partitions for storing the similarity groups referenced in slice recipe name strings.

The controller module 192-1 continuously compares the running tally of the total memory size of the worker node memory partitions reserved for the similarity groups to the previously calculated and stored total memory size of worker node memory partitions for the slice recipe names. Upon detecting that the running tally of the worker node memory size for the referenced similarity groups exceeds the total worker node memory size for all the slice recipe names, the controller module 192-1 detects occurrence of the worker node memory condition and selects the slice recipe verification path. Since the slice recipe verification path is to be performed, the controller module 192-1 instantiates one or more worker nodes according to the previously determined internal worker node memory partitions for storage of the slice recipe names (step 608).

However, if the running tally of the total memory size of the worker node memory partitions for storing the similarity groups never exceeds the total worker node memory size for the slice recipe names, the controller module 192-1 determines the worker node memory condition has not occurred and thereby selects the similarity group verification path. Since the similarity group verification path is to be performed, the controller module 192-1 instantiates one or more worker nodes according to the internal worker node memory partitions for storage of the referenced similarity groups (step 608).

Figure 6B:
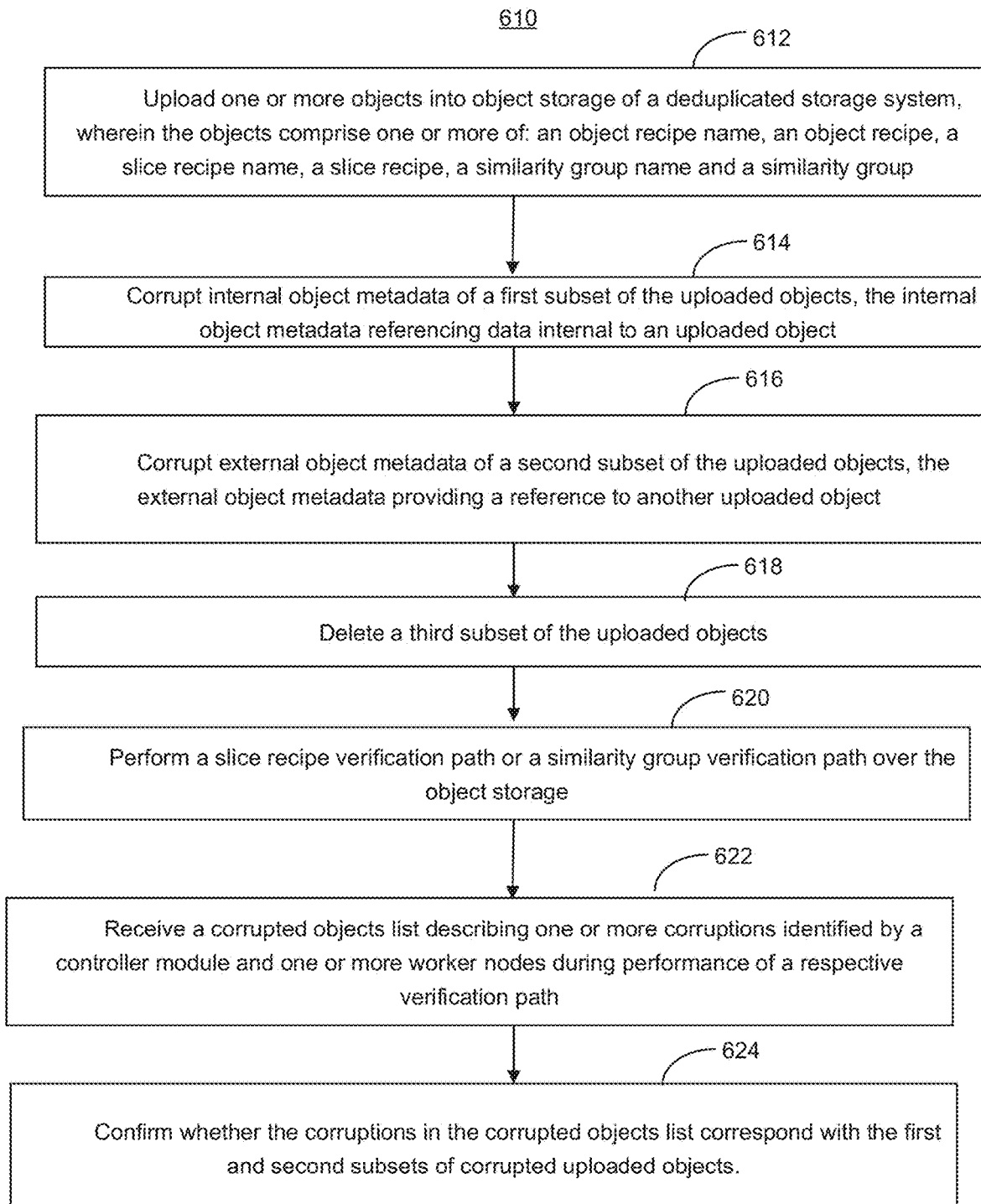
FIG. 6B is a flow diagram illustrating an example method according to one or more embodiments of the disclosure.

As shown in FIG. 6B, method 610 includes at step 612, the testing tool module 198 includes the upload object module 198-1 which uploads one or more objects into object storage of a deduplicated storage system, wherein the objects uploaded comprise one or more of: an object recipe name, an object recipe, a slice recipe name, a slice recipe, a similarity group name and a similarity group. For example, the upload object module 198-1 identifies a select number of virtual servers for running application within the cloud computing environment 190. Virtual server instances are created in the amount according to the select number and each virtual server instance uploads objects into object storage 180-1 using a synthetic data generator perfload. Each virtual server instance uploads a certain number of objects according to a predefined ratio of a number of objects to be uploaded per number of virtual server instances. Each virtual server's synthetic data generator uploading of the objects runs in parallel.

At step 614, the corrupt & delete module 198-3 of the testing tool 198 corrupts internal object metadata of a first subset of the uploaded objects, where the internal object metadata referencing data internal to an uploaded object. For example, internal object metadata may be the "part value slices X" index of an object recipe and other similar variable and parameters within an object. Such internal object metadata exists to track and locate other object metadata and does not itself represent substantive data of an object, slice recipe, similarity group or compression region. Nonetheless, corruption of internal object metadata is still a concern because corrupted internal object metadata interferes with locating and tracking substantive metadata stored in the same object.

At step 616, the corrupt & delete module 198-3 corrupts external object metadata of a second subset of the uploaded objects, the external object metadata providing a reference to another uploaded object. For example, external object metadata is metadata stored within an object that references another object or represents data stored in another object or represents a location or identity of another object. For example, a fingerprint stored in a similarity group or a slice recipe is external object metadata. A reference to a similarity group stored in a slice recipe or a compression region name stored in a similarity group are also examples of external object metadata. At step 618, the corrupt & delete module 198-3 deletes a third subset of the uploaded objects. For example, the corrupt & delete module 198-3 deletes objects from object storage 180-1 and replaces each deleted object with its corresponding corrupted version created by the corrupt & delete module 198-3.

According to various embodiments, a first phase of the corrupt & delete module 198-3 is to corrupt one or more object recipes. Object recipe corruption may include any or all of the following: adding a slice part, removing a slice part, incrementing a slice count and/or decrementing the slice count. Removal of the slice part is based on a randomly generated number where the random number represents the corresponding index of "number of slices per part" of the array of the object recipe and the identified index is removed. For adding a slice part, the corrupt & delete module 198-3 increments the corresponding index of "number of slices per part" of the array. Incrementing and decrementing the slice count is simply adding to or subtracting one from the "part value slices X" parameter, respectively. Once the appropriate corruption is made, the corrupt & delete module 198-3 removes the existing object is deleted from object storage and the object's corrupted version is uploaded into object storage to take its place. The corrupt & delete module 198-3 also stores an identity of the corrupted object recipe in a local mapping separate from the object storage 180-1.

The second phase of the corrupt & delete module 198-3 is to corrupt one or more slice recipes. Slice recipe corruption may include corrupting fingerprints, corrupting a slice recipe name, corrupting a similarity group and/or a combination of corruption both a slice recipe name and a similarity group. The corrupt & delete module 198-3 corrupts fingerprints by determining the total number of segments in the slice recipe. A first randomly generated number (between 0 to the last index array) is used to identify an array index of a select segment from the total number of segments. Next, a second randomly generated number (between 1 and the number of fingerprints) represents how many fingerprints to corrupt that are in the array indexed by the first randomly generated number. For each fingerprint starting at the first position up to the position represented by the second randomly generated number, the corrupt & delete module 198-3 corrupts each respective fingerprint by flipping the respective fingerprint bitwise.

The corrupt & delete module 198-3 corrupts a slice recipe name by incrementing the similarity group identifier ("G<uint32>"). However, if the similarity group identifier is represented by a maximum value, the corrupt & delete module 198-3 decrements the max similarity group identifier. The corrupt & delete module 198-3 corrupts the similarity group reference stored within the slice recipe by incrementing or decrementing the similarity group reference. The corrupt & delete module 198-3 also stores an identity of the corrupted slice recipe in the local mapping separate from the object storage 180-1. Once the appropriate corruption is made, the original slice recipe is deleted from object storage and replaced with the corrupted version of the slice recipe.

The third phase of the corrupt & delete module 198-3 is to corrupt one or more similarity groups. The corrupt & delete module 198-3 corrupts one or more compression region names in a similarity group and/or one or more fingerprints stored in the similarity group. The corrupt & delete module 198-3 corrupts a compression region name stored in the similarity group by determining the number of compression regions to corrupt according to a randomly generated number. For each compression region name to corrupt, the corrupt & delete module 198-3 accesses its respective compression region hash and switches the positions of the first half of the hash and the second half of the hash (i.e. 123456 becomes 456123).

The corrupt & delete module 198-3 corrupts one or more fingerprints in a similarity group according to a randomly generated compression region index that maps to a compression region name associated with a fingerprint array in the similarity group's array of structures. In various embodiments, the randomly generated numbers for the compression region index may have a maximum limit. A first randomly generated number by the corrupt & delete module 198-3 represents a segment index and a second randomly generated number represents a total number of fingerprints to corrupt where fingerprints to be corrupted are associated with the first randomly generated segment index. For each fingerprint up to the second randomly generated, each respective fingerprint is flipped bitwise. Once the fingerprints are corrupted, the corrupt & delete module 198-3 increments the similarity group's transaction identifier in order to represent that the corrupted similarity group associated with the incremented transaction identifier is the latest version of the similarity group in object storage 180-1. The corrupt & delete module 198-3 stores an identity of the corrupted similarity group in the local mapping.

At step 620, the verification tool module 198-2 of the testing tool 198 performs a slice recipe verification path or a similarity group verification path over the object storage 180-1 which includes the corrupted objects created by the corrupt & delete module 198-3. At step 622, the testing tool 198 receives a corrupted objects list describing one or more corruptions identified by a controller module and one or more worker nodes during performance of a respective verification path triggered by the verification tool module 198-2. At step 624, the testing tool confirms whether the corruptions in the corrupted objects list correspond with the first and second subsets of corrupted uploaded objects and the third subset of deleted uploaded objects. For example, the testing tool 198 compares the received corrupted object list with the local mapping created by the corrupt & delete module 198-3 which describes the various objects that were corrupted and the corruptions that were performed. If the received corrupted object list matches the corrupt & delete module's 198-3 local mapping, the testing tool 198 provides a notification that the performed verification path was executed correctly. If the received corrupted object list does not match the corrupt & delete module's 198-3 local mapping, the testing tool 198 provides a notification that the performed verification path was not executed correctly with a list of all potentially corrupted objects.

Figure 7:
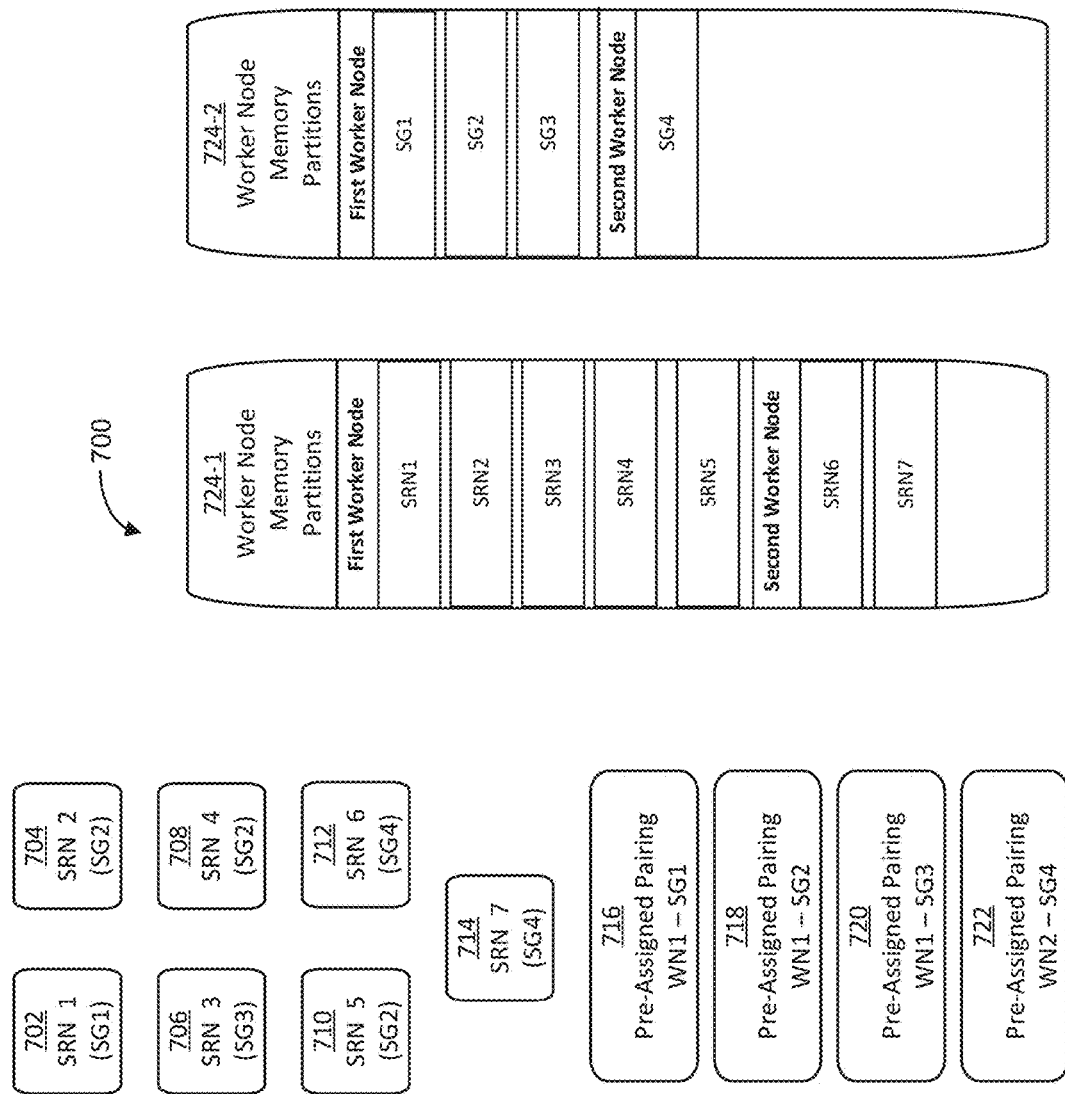
FIG. 7 is a block diagram illustrating worker node estimation according to one or more embodiments of the disclosure.

As shown in a diagram 700 of FIG. 7, a first slice recipe name 702 references similarity group 1 (SG1), a second slice recipe name 704 references similarity group 2 (SG2), a third slice recipe name 706 references similarity group 3 (SG3), a fourth slice recipe name 708 references SG2, a fifth slice recipe name 710 also references SG2, a sixth slice recipe name 712 references similarity group 4 (SG4) and a seventh slice recipe name 714 also references similarity group 1 (SG4). A first worker node has been pre-assigned pairings 712, 714, 716 to SG1, SG2 and SG3. A second worker node has been pre-assigned pairings 720, 722 to SG4.

The controller module 192-1 performs a first pass of available worker node memory 724-1 and identifies a total amount of worker node memory from memory partitions in the first worker node for storing the slice recipe names 702, 704, 706, 708, 710 that reference the similarity groups (SG1, SG2, SG3) to which the first worker node has been preassigned. The controller module 192-1 identifies a total amount of worker node memory from memory partitions in the second worker node to store the slice recipe names 712, 714 that reference the fourth similarity group (SG4) to which the second worker node has been preassigned.

Once the controller module 192-1 has identified worker node memory partitions for all the slice recipe names, the controller module 192-1 performs a second pass of the available worker node memory 724-2 without regard to the worker node memory partitions identified during the first pass 724-1. During the second pass 724-2, he controller module 192-1 identifies memory partitions in the first worker for storing the similarity groups (SG1, SG2, SG3) referenced in the slice recipe names 702, 704, 706, 708, 710 since those similarity groups (SG1, SG2, SG3) have been preassigned to the first worker node. The controller module 192-1 identifies memory partitions in the second worker node for storing the fourth similarity group (SG4) referenced in the sixth and seventh slice recipe names 712, 714 since the second worker node has been preassigned a pairing 722 with SG4. The controller module 192-1 instantiates the first and second worker nodes according to the worker node memory partitions identified during the first pass 724-1 if the slice recipe verification path is selected. However, the controller module 192-1 instantiates the first and second worker nodes according to the worker node memory partitions identified during the second pass 724-2 if the similarity group verification path is selected.

Exemplary Computing System

Figure 8:
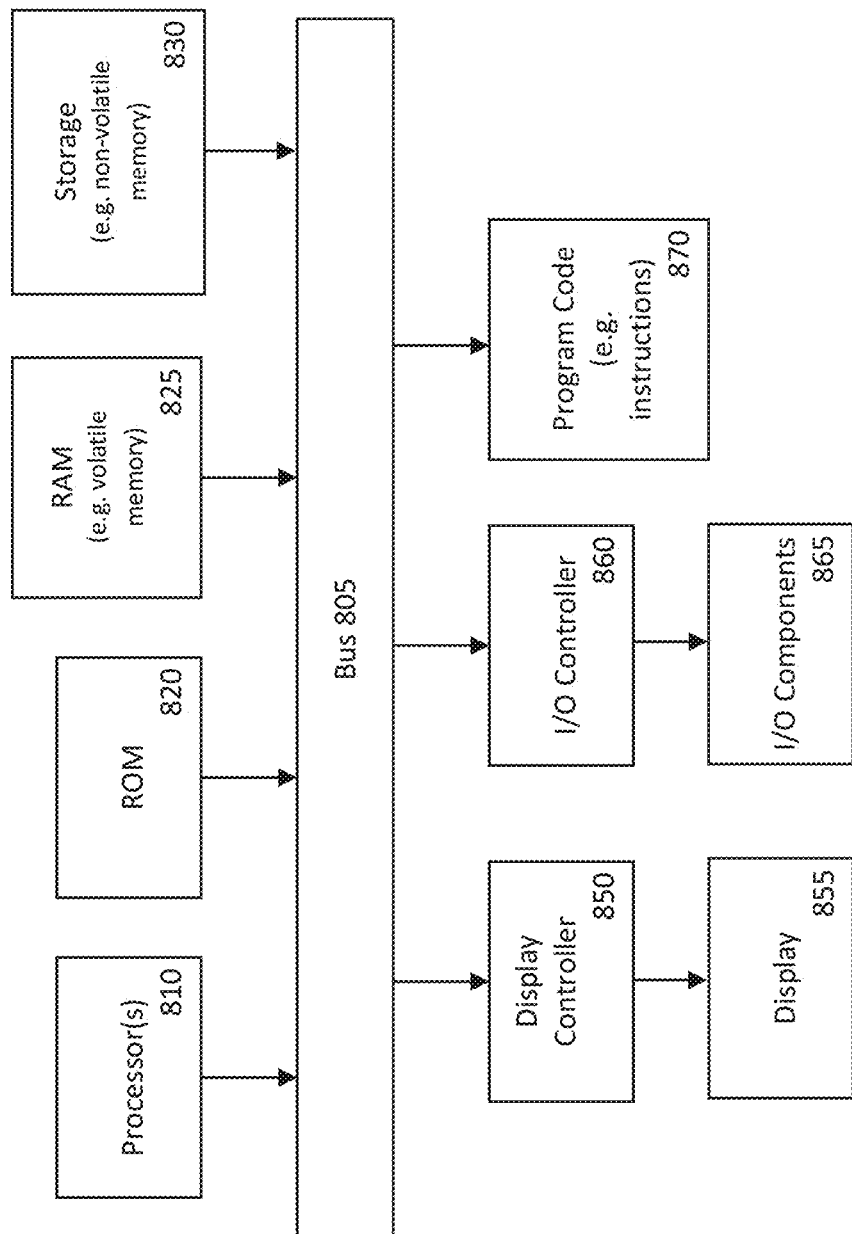
FIG. 8 is a block diagram illustrating a phase according to one or more embodiments of the disclosure.

FIG. 8 shows a block diagram of an example of a computing system that may be used in conjunction with one or more embodiments of the disclosure. For example, computing system 800 (or system, or server, or computing device, or device) may represent any of the devices or systems described herein that perform any of the processes, operations, or methods of the disclosure. Note that while the computing system 800 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor(s) 810 may retrieve stored instructions from one or more of the memories 820, 825, and 830 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 810 may perform operations in an on-demand or "cloud computing" environment or as a service (e.g. within a "software as a service" (SaaS) implementation). Accordingly, the performance of operations may be distributed among the one or more processors 810, whether residing only within a single machine or deployed across a number of machines. For example, the one or more processors 810 may be located in a single geographic location (e.g. within a home environment, an office environment, or a server farm), or may be distributed across a number of geographic locations. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g. accessible via a network).

A display controller 850 may be coupled to the bus 805 in order to receive display data to be displayed on a display device 855, which can display any one of the user interface features or embodiments described herein and may be a local or a remote display device. The computing system 800 may also include one or more input/output (I/O) components 865 including mice, keyboards, touch screen, network interfaces, printers, speakers, and other devices. Typically, the input/output components 865 are coupled to the system through an input/output controller 860.

Program code 870 may represent any of the instructions, applications, software, libraries, toolkits, modules, components, engines, units, functions, logic, etc. as described herein. Program code 870 may reside, completely or at least partially, within the memories described herein (e.g. non-transitory computer-readable media), or within a processor during execution thereof by the computing system. Program code 870 may include both machine code, such as produced by a compiler, and files containing higher-level or intermediate code that may be executed by a computing system or other data processing apparatus (or machine) using an interpreter. In addition, program code 870 can be implemented as software, firmware, or functional circuitry within the computing system, or as combinations thereof. Program code 870 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A computer-implemented method, comprising:
   determining a first total memory size of worker node memory identified for storage of slice recipe names currently located in object storage of a deduplicated storage system, wherein each slice recipe name references a similarity group and each similarity group is pre-assigned to a worker node;
   determining a second total memory size of the worker node memory identified for storage of the referenced similarity groups; and
   estimating a number of worker nodes to be instantiated based on the first total memory size or the second total memory size of worker node memory for performance of a slice recipe verification path or a similarity group verification path, the first total memory size or the second total memory size of worker node memory the first total memory size of worker node memory supporting the slice recipe verification path and the second total memory size of worker node memory supporting the similarity group verification path.

2. The computer-implemented method of claim 1, further comprising:
   detecting occurrence of a worker node memory condition indicating the second total memory size of worker node memory for the referenced similarity groups exceeds the first total memory size of worker node memory for the slice recipe names.

3. The computer-implemented method of claim 2, wherein the first total memory size of worker node memory for the slice recipe names includes memory sizes of respective memory partitions internal to a plurality of the worker nodes and wherein the second total memory size of worker node memory for the referenced similarity groups includes the memory sizes of one or more of the respective memory partitions internal to the plurality of the worker nodes.

4. The computer-implemented method of claim 2, further comprising:
   tracking a running tally of a total memory size of worker node memory identified for storage of a subset of the referenced similarity groups; and
   comparing the running tally of the total memory size of worker node memory for the subset of referenced similarity groups to the first total memory size of worker node memory identified for the slice recipe names; and
   detecting an occurrence of the worker node memory condition based upon the running tally for the subset of referenced similarity groups exceeding the first total memory size of worker node memory identified for the slice recipe names.

5. The computer-implemented method of claim 4, further comprising:
   instantiating one or more worker nodes with respective internal memory partitions for storing the slice recipes names that corresponds to first total memory size of worker node memory, the respective, instantiated worker nodes for support of performance of the slice recipe verification path.

6. The computer-implemented method of claim 4, further comprising:
   detecting absence of the worker node memory condition based upon a final tally of the total memory size of worker node memory for all referenced similarity groups not exceeding the first total memory size of worker node memory identified for the slice recipe names.

7. The computer-implemented method of claim 6, further comprising:
instantiating one or more worker nodes with respective internal memory partitions for storing the referenced similarity groups that corresponds to the final tally the total memory size of worker node memory for all referenced similarity groups, the respective, instantiated worker nodes for support of performance of the similarity group verification path.

8. A system comprising:
one or more processors; and
a non-transitory computer readable medium storing a plurality of instructions, which when executed, cause the one or more processors to:
determine a first total memory size of worker node memory identified for storage of slice recipe names currently located in object storage of a deduplicated storage system, wherein each slice recipe name references a similarity group and each similarity group is pre-assigned to a worker node;
determine a second total memory size of the worker node memory identified for storage of the referenced similarity groups; and
estimate a number of worker nodes to be instantiated based on the first total memory size or the second total memory size of worker node memory for performance of a slice recipe verification path or a similarity group verification path, the first total memory size of work node memory supporting the slice recipe verification path and the second total memory size of worker node memory supporting the similarity group verification path.

9. The system of claim 8, wherein the plurality of instructions, when executed, further cause the one or more processors to:
detect occurrence of a worker node memory condition indicating the second total memory size of worker node memory for the referenced similarity groups exceeds the first total memory size of worker node memory for the slice recipe names.

10. The system of claim 9, wherein the first total memory size of worker node memory for the slice recipe names includes memory sizes of respective memory partitions internal to a plurality of the worker nodes and wherein the second total memory size of worker node memory for the referenced similarity groups includes the memory sizes of one or more of the respective memory partitions internal to the plurality of the worker nodes.

11. The system of claim 9, wherein the plurality of instructions, when executed, further cause the one or more processors to:
track a running tally of a total memory size of worker node memory identified for storage of a subset of the referenced similarity groups; and
compare the running tally of the total memory size of worker node memory for the subset of referenced similarity groups to the first total memory size of worker node memory identified for the slice recipe names; and
detect an occurrence of the worker node memory condition based upon the running tally for the subset of referenced similarity groups exceeding the first total memory size of worker node memory identified for the slice recipe names.

12. The system of claim 11, wherein the plurality of instructions, when executed, further cause the one or more processors to:
instantiate one or more worker nodes with respective internal memory partitions for storing the slice recipes names that corresponds to first total memory size of worker node memory, the respective, instantiated worker nodes for support of performance of the slice recipe verification path.

13. The system of claim 11, wherein the plurality of instructions, when executed, further cause the one or more processors to:
detect absence of the worker node memory condition based upon a final tally of the total memory size of worker node memory for all referenced similarity groups not exceeding the first total memory size of worker node memory identified for the slice recipe names.

14. The system of claim 13, wherein the plurality of instructions, when executed, further cause the one or more processors to:
instantiate one or more worker nodes with respective internal memory partitions for storing the referenced similarity groups that corresponds to the final tally the total memory size of worker node memory for all referenced similarity groups, the respective, instantiated worker nodes for support of performance of the similarity group verification path.

15. A computer program product comprising a non-transitory computer-readable medium having a computer-readable program code embodied therein to be executed by one or more processors, the program code including instructions to:
determine a first total memory size of worker node memory identified for storage of slice recipe names currently located in object storage of a deduplicated storage system, wherein each slice recipe name references a similarity group and each similarity group is pre-assigned to a worker node;
determine a second total memory size of the worker node memory identified for storage of the referenced similarity groups; and
estimate a number of worker nodes to be instantiated based on the first total memory size or the second total memory size of worker node memory for performance of a slice recipe verification path or a similarity group verification path, the first total memory size of worker node memory supporting the slice recipe verification path and the second total memory size of worker node memory supporting the similarity group verification path.

16. The computer program product of claim 15, wherein the program code includes further instructions to:
detect occurrence of a worker node memory condition indicating the second total memory size of worker node memory for the referenced similarity groups exceeds the first total memory size of worker node memory for the slice recipe names.

17. The computer program product of claim 16, wherein the first total memory size of worker node memory for the slice recipe names includes memory sizes of respective memory partitions internal to a plurality of the worker nodes and wherein the second total memory size of worker node memory for the referenced similarity groups also includes the memory sizes of one or more of the respective memory partitions internal to the plurality of the worker nodes.

18. The computer program product of claim 16, wherein the program code includes further instructions to:

track a running tally of a total memory size of worker node memory identified for storage of a subset of the referenced similarity groups; and compare the running tally of the total memory size of worker node memory for the subset of referenced similarity groups to the first total memory size of worker node memory identified for the slice recipe names; and detect an occurrence of the worker node memory condition based upon the running tally for the subset of referenced similarity groups exceeding the first total memory size of worker node memory identified for the slice recipe names.

19. The computer program product of claim 18, wherein the program code includes further instructions to:

instantiate one or more worker nodes with respective internal memory partitions for storing the slice recipes names that corresponds to first total memory size of worker node memory, the respective, instantiated worker nodes for support of performance of the slice recipe verification path.

20. The computer program product of claim 18, wherein the program code includes further instructions to:

detect absence of the worker node memory condition based upon a final tally of the total memory size of worker node memory for all referenced similarity groups not exceeding the first total memory size of worker node memory identified for the slice recipe names; and instantiate one or more worker nodes with respective internal memory partitions for storing the referenced similarity groups that corresponds to the final tally the total memory size of worker node memory for all referenced similarity groups, the respective, instantiated worker nodes for support of performance of the similarity group verification path.

\* \* \* \* \*